United States Patent [19]

Wickson

[11] Patent Number: 4,656,214

[45] Date of Patent: Apr. 7, 1987

[54] STAIN RESISTANT PLASTICIZERS AND COMPOSITIONS

[75] Inventor: Edward J. Wickson, Baton Rouge, La.

[73] Assignee: Exxon Research & Engineering Co., Florham Park, N.J.

[21] Appl. No.: 842,205

[22] Filed: Mar. 21, 1986

Related U.S. Application Data

[63] Continuation-in-part of Ser. No. 661,425, Oct. 16, 1984, abandoned.

[51] Int. Cl.$^4$ .......................... C08K 5/09; C08K 5/10; C08K 5/12; C07C 69/76
[52] U.S. Cl. ................................ 524/287; 560/105; 560/112
[58] Field of Search .......................... 560/1, 105, 112; 524/287

[56] References Cited

U.S. PATENT DOCUMENTS

| | | |
|---|---|---|
| 2,454,274 | 11/1948 | Daly et al. . |
| 2,700,656 | 1/1955 | Emerson et al. . |
| 2,766,266 | 10/1956 | Emerson et al. . |
| 3,158,585 | 11/1964 | Kelso et al. . |
| 3,160,569 | 12/1964 | Toyama et al. . |
| 3,160,599 | 12/1964 | Scullin . |
| 3,167,524 | 1/1965 | Lauck et al. . |
| 3,341,574 | 9/1967 | Taylor et al. . |
| 3,349,107 | 10/1967 | Pawlenko . |
| 3,414,609 | 12/1968 | Hagemeyer, Jr. et al. ......... 524/311 |
| 3,433,661 | 3/1969 | Maggart et al. . |
| 3,562,300 | 2/1971 | Chao et al. . |
| 3,652,610 | 3/1972 | Coopersmith et al. . |
| 3,672,591 | 1/1963 | Farh . |
| 3,939,201 | 2/1976 | Bacskai ............................... 524/311 |
| 3,970,631 | 7/1976 | Bacskai ............................... 524/569 |
| 4,024,164 | 5/1977 | Bailey et al. . |
| 4,074,058 | 2/1978 | Bailey et al. . |
| 4,107,192 | 8/1978 | Bailey et al. . |

FOREIGN PATENT DOCUMENTS

| | | |
|---|---|---|
| 52-101253 | 8/1977 | Japan . |
| 998974 | 7/1965 | United Kingdom . |
| 1119897 | 7/1968 | United Kingdom . |

OTHER PUBLICATIONS

Chemical Abstracts vol. 85, 1976–63892t, p. 40, Boudreaux et al.
U.S. Ser. No. 792,139; filed 10/28/85; "Improved Process for Preparing Glycol Monoesters"; CS-393.
*The Technology of Plasticizers*, J. Kern Sears et al., Plasticizers Division, pp. 555–580 (1982).
*Steric Effects in Organic Chemistry*, pp. 204–207, Newman, 1956.
*J. Amer. Oil Chem. Soc.*, vol. 53, pp. 176–178 (1976), A. V. Bailey, et al.
*Soc. Plastic Eng. Preprint*, Annual Technical Conference, pp. 238–242, E. J. Wickson, et al.
H. Koch in Brennstoff Chem. 36,321 (1955).

*Primary Examiner*—Joseph L. Schofer
*Assistant Examiner*—N. Sarofim
*Attorney, Agent, or Firm*—J. B. Murray, Jr.

[57] ABSTRACT

Novel compounds are provided which have been found to be particularly useful as stain resistant plasticizers. These plasticizers impart improved low temperature flexibility to the plasticized compositions. In addition, the novel plasticizers of this invention have been found to provide plastisols and organosols of low viscosity, which is a very advantageous property for plastisols and organosols intended for use in the manufacture of vinyl sheet floorings since it enables a reduction in the amount of volatile solvent normally employed.

48 Claims, No Drawings

STAIN RESISTANT PLASTICIZERS AND COMPOSITIONS

CROSS-REFERENCE TO RELATED APPLICATIONS

This application is a continuation-in-part of co-pending Ser. No. 661,425 filed Oct. 16, 1984.) now abandoned.

BACKGROUND OF THE INVENTION

1. Field of Invention

This invention relates generally to vinyl chloride plasticizers and more particularly to novel stain resistant plasticizers.

2. Description of the Prior Art

Many polymeric materials, e.g., poly (vinyl chloride), cellulosics, etc., are of a relatively hard and brittle nature. To improve softness and flexibility so that the resulting product is usable in a wide variety of applications, it is necessary to add a plasticizing agent to the polymer. The basic attributes of a good plasticizer are:

(1) compatibility with the polymer or resin it is to plasticize;

(2) capability of imparting desired processability and softness, etc.;

(3) thermal stability under the conditions of processing and subsequent aging; and (4) permanence to loss, particularly through volatilization, but also through solvent extraction, migration or exudation.

Compatibility is normally defined as the ability of the plasticizer to produce a clear film and to remain more or less homogeneously dispersed throughout the resin composition, particularly on aging. Permanence refers to the tendency of the plasticizer to resist loss through volatilization, chemical breakdown, extraction by water, soapy water, or organic solvents, migration and exudation. Other important attributes of a plasticizer are efficiency, i.e., the amount of plasticizer required to impart desired properties (depending on relative costs and specific gravities of the plasticizer and resin, high efficiency can result in reduced or increased volume costs of the plasticized resin composition), ability to impart low temperature flexibility to a resin, ability to allow ease of processing to the resin system, i.e., flows and molds or extrudes readily and the like.

Providing improved stain resistant surfaces is a highly important objective of the flooring and wall covering industries in vinyl resin end-uses such as protective coverings for surfaces which are usually designed to decorate and enhance the appearance of the area. In many uses, these protective surface coverings are exposed to wear and abrasion and in addition are exposed to action by other materials which tend to discolor or stain the composition thereby materially reducing the decorative appearance of the covering. The problem of staining is not limited to but is especially serious in poly (vinyl chloride) covering compositions used on walls and floors and other areas where there is frequent exposure to and contact with materials which tend to stain and discolor.

However, due to the wide variety of possible stainants with which, for example, vinyl sheet flooring can be expected to come into contact over its useful life, stain resistance is a highly complex problem which is only incompletely understood. The determination of stain resistance of plasticized poly (vinyl chloride), and the complex problems associated therewith, are discussed at some length in J. K. Sears and J. R. Darby, *The Technology of Plasticizers,* pages 555–580 (1982).

Therefore, a stain resistant plasticizer must satisfy the usual basic plasticizer attributes and, in addition, impart the desired stain resistant properties in the plasticized resins.

Prior art plasticizers which have been found to impart improved stain resistant properties to plasticized vinyl chloride compositions include those disclosed in U.S. Pat. Nos. 3,158,585 and 3,160,599. The stain resistant plasticizers of U.S. Pat. No. 3,158,585 comprise esters of phthalic acid, in which the alcohol moieties thereof are selected from the group consisting of tetrahydropyran-2-methyl groups, alkoxyalkylene groups having 3 to 8 carbon atoms, and lower alkyl groups having from 1 to 5 carbon atoms. The stain resistant plasticizers of U.S. Pat. No. 3,160,569 comprise the monoisobutyrate monobenzoate ester of 2,2,4-trimethyl-pentane-1,3-diol having the structural formula (I):

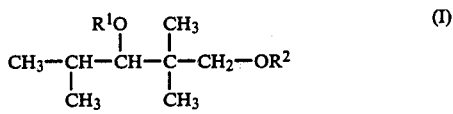

wherein R$^1$ and R$^2$ together represent the radicals

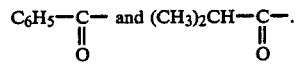

A. V. Bailey, et. al., *J. Amer. Oil Chem. Soc.,* vol. 53, 176–178 (1976) investigated the use as PVC plasticizers of certain mixed esters of three diols (ethylene glycol, diethylene glycol and 2-butene-1,4-diol) wherein one of the ester moieties was benzoate. Esters containing two aroyl groups or benzoyl and a short branched-chain alkanoyl group (trimethylacetate) were found to be compatible plasticizers for PVC resin. However, esters containing one benzoyl group and a longer chain alkanoyl group gave mixed results; with the C$_{29}$ triester (benzoyloxyethyl 12-acetoxyoleate) and C$_{21}$ diester (benzoyloxyethyl laurate) compounds being found to be compatible, whereas the C$_{27}$ diester (benzoyloxyethyl oleate) and C$_{25}$ diester (benzoyloxyethyl palmitate) compounds were not. (Related to the A. V. Bailey et. al., article are U.S. Pat. Nos. 4,024,164; 4,074,058 and 4,107,192.)

E. J. Wickson, et. al., *Soc. Plastic Eng. Preprint, Annual Technical Conference,* pp. 238–242 (1969) compares certain PVC plasticizer performance properties of ethylene glycol diesters in which one ester group is derived from neo-decanoic acid and neotridecanoic acid and in which the second ester group is derived from a dibasic acid selected from the group consisting of adipic, azelaic and phthalic acids.

U.S. Pat. No. 2,454,274 relates to the manufacture of certain mixed aliphatic aromatic esters of glycols such as ethylene glycol acetate benzoate and to their use as plasticizers for organic esters and ethers of cellulose.

U.S. Pat. Nos. 2,700,656 and 2,766,266 relate to plasticized polyvinyl chloride compositions containing diesters of substituted 1,5-pentene diols in which one ester in the group is derived from an aromatic acid and the second ester group is derived from certain mono-carboxylic aliphatic acids. Mono-carboxylic aliphatic acids containing from 8 to 12 carbon atoms, with caprylic, pelargonic, capric, undecylic, lauric, 2-ethyl-hexanoic acids are indicated as suitable.

U.S. Pat. No. 3,072,591 relates to plasticized vinyl resins in which the plasticizer is one or more aromatic-aliphatic carboxylic acid mixed esters of a polymethylolalkane containing at least three methylol groups, wherein one mole of an aromatic acid, and the remaining methylol groups are esterified with one or more saturated aliphatic acids having an average carbon content of not less than 6 carbon atoms, with individual aliphatic acids ranging from 6 to 18 carbon atoms, and mixtures of aliphatic acids ranging from 4 to 18 carbon atoms.

U.S. Pat. No. 3,341,574 relates to synthetic high temperature lubricant compositions comprising of carboxylic acid esters having a carboxylic group bonded to a quaternary carbon atom (the alpha carbon), with a polyol having a quaternary carbon atom bonded to 2 to 3 methylol groups. The esters include neoalkanoic acid esters, with suitable neoalkanoic acids being indicated as including 2,2-dimethylalkanoic acids having chain lengths of from 4 to 13 carbons such as neodecanoic acid, neotridecanoic acid, 2,2,4,4-tetramethylpentanoic acid, 2-methyl-2-ethyl caproic acid, neo-nonanoic acid and neo-heptanoic acid, which is preferred. Suitable polyols include trimethylolpropane, trimethylolethane, 2,2,4-trimethyl 1,3-pentanediol and 2-butyl, 2-ethyl propanediol. However, no plasticizer use of these lubricants is disclosed or suggested.

U.S. Pat. No. 3,433,661 discloses certain stain resistant plasticizers which are complex mono-esters prepared from aromatic hydrocarbons, formaldehyde and certain monocarboxylic acids.

U.S. Pat. No. 3,562,300 relates to liquid neoalkylpolyol esters of mixtures of neo- and straight or branched-chain alkanoic esters, which are disclosed to be useful as lubricants or plasticizers, and which are prepared by esterifying (1) a neo-alkyl polyol of up to 10 or 12 or more carbon atoms and 2 to 6 hydroxyl groups with (2) a straight chain alkanoic carboxylic acid having from 4 to 12 carbon atoms or branched chain alkanoic acids of 4 to 12 carbon atoms other than neo acids, and (3) a neo alkanoic acid having 5 to 20 carbon atoms. The patentee's esters are prepared by a multi-step procedure and are said to provide improved properties over known lubricants including neoalkylpolyol esters of straight chain fatty acids (e.g., pentaerythritol tetracaproate); esters derived from neoalkylpolyols and branched-chain fatty acids (e.g., pentaerythritol tetrapivalate); di-ethylhexyl sebacate; esters of neoalkyl fatty acids and neoalkyl polyols of 3 to 5 hydroxyl groups; and esters prepared from neopentylpolyols and mixtures of neo- and straight-chain acids (e.g., pentaerythritol esters of mixtures of neoheptanoic and n-valeric acids containing less than 50 mol.% n-valeric groups) using the therein described "conventional" one-step procedure.

U.S. Pat. No. 3,652,610 is directed to plasticizers prepared by the reaction of a hindered acid glycol monoester and di- or tri-basic acids or anhydrides. Illustrative of the monoester reactant are the neo-acid esters of $C_2$–$C_{15}$ alkanols, in which the neo-acid moiety can be derived from trimethylacetic acid; alpha, alpha-dimethyl cyclohexylacetic acid; alpha, alpha-dimethyl phenylacetic acid; alpha, alpha-dimethyl pentanoic acid and the like.

Japanense Patent Publication 77/101,253 discloses plasticizers comprising polyalkylene glycol diesters which have 1 to 14 ether bonds and which are derived from 2 to 6 carbon atom alkylene glycols, and have one benzoic acid ester group and a second ester group derived from straight chain, saturated fatty acids of 8 to 22 carbons, or from branched chain, saturated fatty acids of 8 to 22 carbons which are substituted on the alpha-carbon by a 1 to 10 carbon side chain.

SUMMARY OF THE INVENTION

According to the present invention, novel compounds useful as stain resistant plasticizers are provided which comprise members selected from the group consisting of compounds of the formula (II):

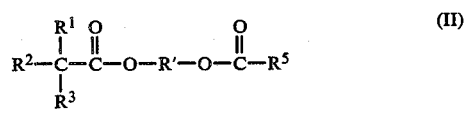

wherein $R^1$ and $R^2$ are the same or different and are independently selected from the group consisting of alkyl of from 1 to 4 carbon atoms, $R^3$ is hydrogen or alkyl of from 1 to 6 carbon atoms and $R'$ is divalent alkylene of from 2 to 8 carbon atoms and $R^5$ is a member selected from the group consisting of phenyl, mono, di or tri alkyl-substituted phenyl having a total of from 7 to 12 carbon atoms and

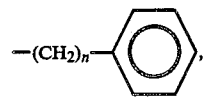

wherein "n" is an integer of from 1 to 6, with the proviso that said compound contains from 16 to 19 carbon atoms per molecule, and with the further proviso that when $R^1$, $R^2$ and $R^3$ contain a total of 2 carbon atoms and $R'$ contains 8 carbon atoms, then $R'$ must comprise a straight chain alkylene or mono- or di-alkyl substituted divalent alkylene.

The novel compounds of this invention when employed as plasticizers have been found to impart high stain resistance and improved low temperature flexibility to the plasticized compositions. In addition, the novel plasticizers of this invention have been found to provide plastisols and organosols of low viscosity, which is a very advantageous property for plastisols and organosols intended for use in the manufacture of vinyl sheet floorings since it enables a reduction in the amount of volatile solvent normally employed.

The compounds of this invention are free from ether groups which are weak points in the molecule and are susceptible to oxidation, which would lead to a degradation of the desirable plasticizer properties. In addition, the plasticizers of this invention have been found to be heat resistant.

DETAILED DESCRIPTION OF THE INVENTION

The novel compounds of this invention comprise members selected from the group consisting of (i) compounds of the formula (II):

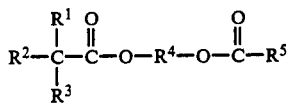

wherein $R^1$ and $R^2$ are the same or different and are independently selected from the group consisting of alkyl of from 1 to 4 carbon atoms, $R^3$ is hydrogen or alkyl of from 1 to 6 carbon atoms, $R^4$ is divalent straight chain alkylene of from 2 to 8 carbon atoms and $R^5$ is a member selected from the group consisting of phenyl, mono, di or tri alkyl-substituted phenyl having a total of from 7 to 12 carbon atoms and

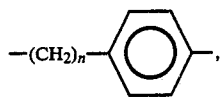

wherein n is an integer of from 1 to 6 with the proviso that said compound contains a total of from 16 to 19 carbon atoms per molecule, inclusive, and mixtures, thereof; (ii) compounds of the formula (III):

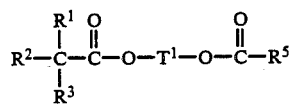

wherein $R^1$, $R^2$, $R^3$ and $R^5$ are as defined above, and $T^1$ is divalent branched-chain alkylene of from 2 to 7 carbon atoms, with the proviso that said compounds contain a total of from 16 to 19 carbon atoms per molecule; and (iii) compounds of the formula (IV):

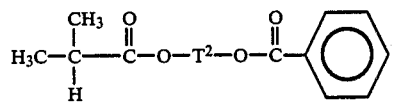

wherein $T^2$ is mono-alkyl or di-alkyl substituted divalent alkylene of 8 carbon atoms.

Exemplary of $R^1$ and $R^2$ alkyl groups in Formulas II and III are methyl, ethyl, n-propyl and iso-propyl, n-butyl, iso-butyl and sec-butyl. Also exemplary of $R^3$ groups are pentyl, hexyl and alkyl substituted derivatives of the foregoing in which the total number of carbon atoms of the alkyl-substituted alkyl group is not greater than 6 carbon atoms, such as 2-methyl-butyl, 3-ethyl-butyl, 2,4-dimethyl-butyl and the like. Preferred in Formulas II and III are members selected from the group consisting of moieties (A) of the formula (V)

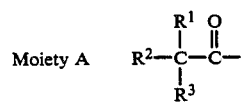

wherein this moiety has a total of from 4 to 10 carbon atoms, and wherein $R^1$, $R^2$ and $R^3$ are as defined above. Exemplary of such preferred moieties "A" are: $CH_3CH(CH_3)CH_2CH_2C(CH_3)_2C(O)$—, $(CH_3)_3CC(O)$—, $(CH_3)_2CHC(O)$—, $(C_2H_5)_2C(CH_3)C(O)$—, $(C_3H_7)_2C(C_2H_5)C(O)$— and the like. Most preferably, in compounds of Formulas II and III, the moieties "A" have a total of 5 to 10 carbon atoms and $R^3$ is alkyl of from 1 to 6 carbon atoms.

Illustrative straight-chain $R^4$ alkylene groups are alkylene groups having the formula —$(CH_2)_m$— wherein "m" is an integer of from 2 to 8, preferably 2 to 7, especially 2 to 5, and most preferably 2 to 3 carbon atoms, such as —$CH_2$—, —$C_2H_4$—, —$C_3H_6$—, —$C_4H_8$—, —$C_5H_{10}$—, —$C_6H_{12}$—, —$C_7H_{14}$— and the like.

Exemplary of $R^5$ groups are phenyl and alkyl-substituted phenyl groups such as tolyl, xylyl, 3-isopropyl-phenyl, 3-methyl-5-ethyl-phenyl and the like. Illustrative $R^5$ groups satisfying the —$(CH_2)_nC_6H_5$ moiety formula are phenyl methylene, phenyl-substituted ethylene, and phenyl-substituted propylene.

Exemplary of $T^1$ branched-chain alkylene groups in the compounds of Formula III are mono- and di-alkyl-substituted alkylene groups of from 2 to 7 carbon atoms which can be represented by the Formula (VI):

wherein x is an integer of from 1 to 6 and $M^1$ and $M^2$ are the same or different, and are independently, for each such substituted divalent chain carbon, selected from the group consisting of alkyl of from 1 to 6 carbon atoms, more preferably from 2 to 4 carbon atoms, with the proviso that such alkyl-substituted alkylene groups have a total of from 2 to 7 carbon atoms. Illustrative of such alkyl-substituted alkylene groups are 2-ethyl-1,3-pentylene [i.e., —$CH_2CH(C_2H_5)CH(C_2H_5)$—], 1-methyl ethylene [i.e., —$CH_2CH(CH_3)$—], 2-methyl-1,3-propylene [i.e., —$CH_2CH(CH_3CH_2)$—], 1,2-ethylene [i.e., —$CH(CH_3)$—], 2,3-pentylene [i.e., —$CH(CH_3)CH(C_2H_5)$—], 3-methyl-2,4-pentylene [i.e., —$CH(CH_3)CH(CH_3)CH(CH_3)$—], and the like. Preferably, $T^1$ comprises divalent alkyl-substituted alkylene groups having a total of from 2 to 5 carbon atoms, and most preferably from 3 to 4 carbon atoms.

Exemplary of $T^2$ mono- and di-alkylsubstituted alkylene divalent groups are 2-ethyl-1,3-hexylene [i.e., —$CH_2CH(C_2H_5)CH(C_3H_7)$—], 2,2-di(ethyl)-1,4-butylene [i.e., —$CH_2CH_2C(C_2H_5)_2CH_2$—], 2-methyl-4-ethyl-1,5-pentylene [i.e., —$CH_2CH(CH_3)CH_2CH(C_2H_5)CH_2$], and the like.

Examples of compounds of Formula (II) are the compounds of Table A below:

TABLE A

| $R^2-\overset{R^1}{\underset{R^3}{\overset{|}{C}}}-\overset{\overset{O}{\|}}{C}-O$ | $R^4$ | $-O-\overset{\overset{O}{\|}}{C}-R^5$ |
|---|---|---|
| neo-heptanoate | —$CH_2CH_2$— | benzoate |
| neo-octanoate | " | " |
| neo-nonanoate | " | " |
| neo-decanoate | " | " |
| neo-hexanoate | " | toluate |
| neo-octanoate | " | " |
| neo-nonanoate | " | " |
| neo-pentanoate | " | ethyl benzoate |
| neo-heptanoate | " | " |
| neo-octanoate | " | " |
| isobutyrate | " | hexyl benzoate |
| neo-hexanoate | —$CH_2CH_2CH_2$— | benzoate |
| neo-heptanoate | " | " |
| neo-octanoate | " | " |
| neo-nonanoate | " | " |

TABLE A-continued $$R^2-\underset{R^3}{\underset{|}{\overset{R^1}{\overset{|}{C}}}}-\overset{O}{\overset{\|}{C}}-O$$

| | $R^4$ | $-O-\overset{O}{\overset{\|}{C}}-R^5$ |
|---|---|---|
| neo-pentanoate | " | toluate |
| neo-hexanoate | " | " |
| neo-heptanoate | " | " |
| neo-octanoate | " | " |
| isobutyrate | " | ethyl benzoate |
| neo-pentanoate | " | " |
| neo-hexanoate | " | " |
| neo-heptanoate | " | " |
| isobutyrate | " | butyl benzoate |
| neo-pentanoate | $-(CH_2)_4-$ | benzoate |
| neo-hexanoate | " | " |
| neo-heptanoate | " | " |
| neo-octanoate | " | " |
| isobutyrate | " | toluate |
| neo-pentanoate | " | " |
| neo-hexanoate | " | " |
| neo-heptanoate | " | " |
| iso-butyrate | " | ethyl benzoate |
| neo-pentanoate | " | " |
| neo-hexanoate | " | " |
| isobutyrate | $-(CH_2)_5-$ | benzoate |
| neo-pentanoate | " | " |
| neo-hexanoate | " | " |
| neo-heptanoate | " | " |
| iso-butyrate | " | toluate |
| neo-pentanoate | " | " |
| neo-hexanoate | " | " |
| iso-butyrate | " | ethyl benzoate |
| isobutyrate | " | " |
| neo-pentanoate | " | " |
| isobutyrate | $-(CH_2)_6-$ | benzoate |
| neo-pentanoate | " | " |
| neo-hexanoate | " | " |
| iso-butyrate | " | ethyl benzoate |
| iso-butyrate | " | toluate |
| neo-pentanoate | " | " |
| iso-butyrate | $-(CH_2)_7-$ | benzoate |
| neo-pentanoate | " | " |
| isobutyrate | " | toluate |
| isobutyrate | $-(CH_2)_8-$ | benzoate |

Examples of compounds of Formula (III) are those set forth in Table B below:

TABLE B $$R^2-\underset{R^3}{\underset{|}{\overset{R^1}{\overset{|}{C}}}}-\overset{O}{\overset{\|}{C}}-O$$

| | $T^1$ | $-O-\overset{O}{\overset{\|}{C}}-R^5$ |
|---|---|---|
| neo-heptanoate | $-CH(CH_3)-$ | benzoate |
| neo-octanoate | " | " |
| neo-nonanoate | " | " |
| neo-decanoate | " | " |
| neo-hexanoate | " | toluate |
| neo-octanoate | " | " |
| neo-nonanoate | " | " |
| neo-pentanoate | " | ethyl benzoate |
| neo-heptanoate | " | " |
| neo-octanoate | " | " |
| isobutyrate | " | hexyl benzoate |
| neo-hexanoate | $-CH(CH_3)CH_2-$ | benzoate |
| neo-heptanoate | " | " |
| neo-octanoate | " | " |
| neo-nonanoate | " | " |
| neo-pentanoate | " | toluate |
| neo-hexanoate | " | " |
| neo-heptanoate | " | " |
| neo-octanoate | " | " |
| isobutyrate | " | ethyl benzoate |
| neo-pentanoate | " | " |
| neo-hexanoate | " | " |
| neo-heptanoate | " | " |
| isobutyrate | " | butyl benzoate |
| neo-pentanoate | $-CH_2CH_2CH(CH_3)-$ | benzoate |

TABLE B-continued $$R^2-\underset{R^3}{\underset{|}{\overset{R^1}{\overset{|}{C}}}}-\overset{O}{\overset{\|}{C}}-O$$

| | $T^1$ | $-O-\overset{O}{\overset{\|}{C}}-R^5$ |
|---|---|---|
| neo-hexanoate | " | " |
| neo-heptanoate | " | " |
| neo-octanoate | $-CH_2CH(CH_3)CH_2-$ | " |
| isobutyrate | " | toluate |
| neo-pentanoate | " | " |
| neo-hexanoate | $-CH(CH_3)CH(CH_3)-$ | " |
| neo-heptanoate | " | " |
| iso-butyrate | " | ethyl benzoate |
| neo-pentanoate | $-CH_2CH(C_2H_5)-$ | " |
| neo-hexanoate | " | " |
| isobutyrate | $-(CH_2)_2CH(CH_3)CH_2-$ | benzoate |
| neo-pentanoate | " | " |
| neo-hexanoate | " | " |
| neo-heptanoate | $-CH_2C(CH_3)_2CH_2-$ | " |
| isobutyrate | " | toluate |
| neo-pentanoate | " | " |
| neo-hexanoate | $-CH_2CH(CH_3)CH(CH_3)-$ | " |
| isobutyrate | " | ethyl benzoate |
| neo-pentanoate | $-(CH_2)_2CH(C_2H_5)-$ | " |
| isobutyrate | $-(CH_2)_3CH(CH_3)CH_2-$ | benzoate |
| neo-pentanoate | $-CH(CH_3)CH_2CH(CH_3)CH_2-$ | " |
| neo-hexanoate | $-CH_2[CH(CH_3)]_2CH_2-$ | " |
| iso-butyrate | " | ethyl benzoate |
| iso-butyrate | $-(CH_2)_2CH(C_2H_5)CH_2-$ | toluate |
| neo-pentanoate | $-CH_2(C_3H_7)CHCH_2-$ | " |
| iso-butyrate | $-CH_2[CH(CH_3)]_2(CH_2)_2-$ | benzoate |
| neo-pentanoate | $-CH_2CH(C_2H_5)_2CH_2-$ | " |
| isobutyrate | " | toluate |

Especially preferred of this invention for use as plasticizers (especially stain resistant plasticizers) are those selected from the group consisting of compounds of the formula (VII):

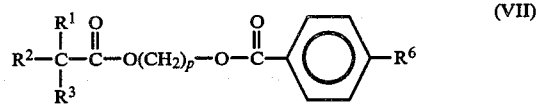

wherein $R^1$, $R^2$ and $R^3$ are as defined above and together have a total of from 2 to 8 carbon atoms, "p" is an integer of from 2-8, and $R^6$ is hydrogen or alkyl of from 1 to 6 carbons, with the proviso that said compound contains a total of from 16 to 19 carbon atoms per molecule, inclusive, and mixtures thereof.

Most preferably, the compounds of this invention for use as plasticizers comprise members selected from the group consisting of compounds of formula (VII) wherein $R^6$ is hydrogen, "p" is 2 to 4, $R^1$ and $R^2$ are the same or different and are each $C_1-C_2$ alkyl and $R^3$ is $C_3-C_6$ alkyl, with the proviso that said compound contains a total of from 16 to 19 carbon atoms per molecule, inclusive. Illustrative of these most preferred group of plasticizers are ethylene glycol benzoate neooctanoate, ethylene glycol benzoate neononanoate, ethylene glycol benzoate neodecanoate and mixtures thereof.

The novel compounds of this invention can be prepared by the reaction of a hindered acid glycol monoester with an aromatic-containing monocarboxylic acid of the formula (VIII):

wherein $R^5$ is as defined above.

The hindered acid glycol monoesters applicable to preparation of compounds of Formula II may be represented by the generic formula (IX):

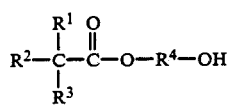

wherein $R^1$, $R^2$, $R^3$ and $R^4$ are as previously defined. Similarly, the hindered acid glycol monoesters applicable to preparation of compounds of Formula III may be represented by the generic formula (X):

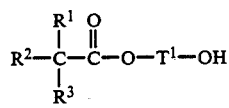

wherein $R^1$, $R^2$, $R^3$ and $T^1$ are as previously defined, and the hindered acid glycol monoesters applicable to preparation of compounds of Formula IV may be represented by the generic formula (XI):

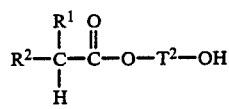

wherein $R^1$, $R^2$ $T^1$ are as previously defined. These monoester compounds can be prepared as disclosed in U.K. Patent No. 1,119,897. Briefly stated, the process described therein involves the reaction of a sterically hindered, saturated monocarboxylic acid with an alkylene oxide under esterification conditions. Alkylene oxides such as ethylene oxide, propylene oxide, butylene oxide, and the like, may be employed. The hindered acids utilized are those wherein the carboxyl groups are sterically blocked or hindered. A discussion of steric hindrance may be found in Newman, Steric Effects in Organic Chemistry, 1956, pp. 204–207. Generally, steric hindrance results from the presence of tertiary, or carbon atoms in the acid; increasing substitution leading to increased hindrance. A particularly preferred method is disclosed in co-pending application, Ser. No. 792,139, filed Oct. 28, 1985 (the disclosure of which is hereby incorporated by reference) in which an amine catalyst is used in the alkylene oxide/neo-acid ethyoxylation reaction to prepare the desired hindered acid glycol monoester.

A class of particularly preferred sterically hindered, saturated, monocarboxylic acids are the neo-acids (neo- is used to denote a carbon atom that is bonded to four other carbon atoms, e.g., as in neo-pentane also known as 2,2-dimethylpropane). Thus, in preparation of monoesters of Formulae IX and X, $R^1$ and $R^2$ are preferably each $C_1$–$C_3$ hydrocarbyl radicals, and $R^3$ is preferably $C_1$ to $C_6$ alkyl. Some typical examples of neo-acids are: trimethylacetic acid; alpha, alpha-dimethylheptanoic acid; and the like. These neo-acids can be prepared by the well-known Koch process from carbon monoxide, water and type II, III, IV or V olefins as described by H. Koch in BrenntstoffChem. 36, 321 (1955). Further details on methods for making neo-acids can be found in British Patent No. 998,974 and U.S. Pat. No. 3,349,107, all of which are incorporated herein by reference. Neo-acids are often made from branched chain olefin feedstocks which are random isomeric mixtures in regard to the position of the olefinic bond. These acids are thus random isomeric mixtures of neo-acids. These neo-acids are suitable in their isomeric forms, or any suitable mixtures thereof may be employed for the reaction to form the corresponding monoester mixtures.

In order to form the novel compounds of this invention, the hindered acid glycol monoester of formulae IX, X or XI (or a mixture thereof), is reacted with an aromatic-containing acid of formulae VIII. Illustrative of such mono-basic acids are aromatic acids such as benzoic acid and alkyl-substituted derivatives thereof such as toluic acid, dimethyl benzoic acid, trimethyl benzoic acid, ethyl toluic acid, propyl-benzoic acid and the like, and mixtures (e.g., isomeric mixtures) thereof.

The conditions under which this reaction occurs may be generally described as esterification conditions and include those known to skilled in the art. Both temperature and pressure may vary over wide ranges. Temperatures ranging from about 80° to 250° C. can be employed, while temperatures of 160° to 230° C. are preferred. Higher temperatures than 230° C. should generally be avoided to minimize the formation of color bodies. Pressures may also vary widely, subatmospheric, atmospheric, and superatmospheric pressures are suitable, e.g., from about 0.1 to 5 atm., e.g., 1–10 atm. The molar ratio of monoester to aromatic-containing acid is not critical but should be at least stoichiometric, i.e., one mole of monoester per mole of carboxylic acid. However, an excess of monoester is normally employed, and the molar ratio may range from stoichiometric to a 100% excess, preferably stoichiometric to a 50% excess, more preferably to a 20% excess of monoester. The reaction period is not critical, and may range from a few minutes, e.g., 30 minutes to several hours, e.g., 6 hours. However, the reaction should be carried out for periods of time sufficient to allow for the reaction of substantially all of the carboxylic acid.

The reaction may be carried out with or without an entrainer to remove water formed during the reaction. Suitable entrainers include aliphatic or aromatic hydrocarbons, for example, $C_{10}$–$C_{16}$ paraffins, e.g., decane, dodecane, etc., $C_6$–$C_{16}$ aromatics, e.g., benzene, toluene, xylene, etc. Entrainers, when employed, should normally comprise about 3–30 wt % of the reaction mixture, preferably 5 to 10 wt %.

Esterification reactions are normally conducted in the presence of catalytic amounts of an esterification catalyst. Illustrative of these catalysts are the strong mineral acids, e.g., $H_2SO_4$ and others such as hypophosphorous acid, p-toluenesulfonic acid, etc., or metal salts such as tin carboxylate salts (e.g., stannous oxalate) and titanates, such as tetraisodecyl titanate, which are preferred. The amount of catalyst may range from about 0.05 to 5.0 wt % based on total weight of reactants, preferably 0.1 to 0.5 wt %.

The novel compounds thus formed are preferably further purified by such standard methods as: base wash followed by water wash until neutral, stripping at about 160° C. under vacuum, treatment with activated alumina, attapulgus clay or Celite (with or without the presence of charcoal), molecular distillation and the like.

Generally, the novel compounds of this invention can be employed with a wide variety of synthetic resins and may also be used as lubricants for synthetic textile fibers, and automatic transmission fluids. However, they are preferably employed to plasticize thermoplastic resins, particulary the vinyl resins. Synthetic rubber can also be plasticized with these esters. The end use of these plasticized resins may be coating materials, molding or extruding materials, calendered sheeting, etc.

The vinyl resins are derived from vinyl chloride monomer, and may also include the co-polymers of vinyl chloride and other mono- and di-olefinically unsaturated monomers copolymerizable therewith. Illustrative of these are poly (vinyl chloride) and the copolymers of vinyl chloride with vinylidene chloride; vinyl-esters of carboxylic acids (e.g., vinyl acetate, vinyl propionate, vinyl butyrate, and the like); esters of unsaturated acids (e.g., alkyl acrylates such as methyl acrylate and the like); and the corresponding esters of methacrylic acid, and the like. However, the plasticizers may also be used in conjunction with other polymers or mixtures thereof including, for example, polyvinyl alcohol, polyvinyl acetate, polyvinyl butryral, polyvinylidene chloride, polyethyl acrylate, polymethyl acrylate, and polymethyl methacrylate.

Cellulosic resins, such as cellulosic esters and mixed esters, e.g., cellulose acetate, cellulose acetate butyrate, cellulose nitrate, and the like, form another class of desirable polymers with which these novel plasticizers are useful. See also U.S. Pat. No. 3,167,524 for halogen resin systems.

The vinyl resins, particularly the vinyl halides, e.g., polyvinyl chloride and copolymers of vinyl halides are preferred.

Preferably, in vinyl resins, comprising co-polymers of vinyl halide with other unsaturated monomers (such as any of those indicated above), at least 70 wt %, and more preferably at least 85 wt % of the total monomer units in the resin are vinyl halide, e.g., vinyl chloride.

The novel plasticizers of this invention are employed in plasticizing amounts. They may be used alone or in association with other plasticizers, and may be used as either primary or secondary plasticizers. The amount of plasticizer employed with any resin system will vary widely based on specific desired properties and the resin system itself. However, the plasticizer may be employed in amounts ranging from about 1 to 200 parts of plasticizer per hundred parts of resin by weight (phr) and preferably 10 to 100 phr.

In many instances, it is desirable to blend into the plasticizer-resin composition such common additives as fillers, pigments, light and heat stabilizers, lubricants, antioxidants, etc. Commonly used stabilizers include barium-cadmium octanoate, lauarate and other metallic soaps. Auxilliary stabilizers may be similarly employed, such as for example, organic phosphites and substituted phenols. Commonly used fillers include clays, calcium carbonate, silicates, barytes, and the like. Commonly used pigments include titanium dioxide and the like. It is apparent that such compositions are well within the scope of this invention.

Also, the novel plasticizers of this invention can either be used as such, or they can be formulated together with other types of plasticizers, such as, for example, epoxidized fatty acid esters, polymeric plasticizers, adipic acid esters, hydrocarbons, and numerous other types commonly used in this art.

The nature and proportions, etc., of the other components which can be included are well known in the art and are not within the scope of the invention.

The improved plasticizers and vinyl resin compositions of the present invention can be further illustrated by reference to the following examples. In the examples, the identity of the plasticizers was determined by gas chromatography, employing a Varian 2700, FID detector, with an HP 3380 integrator, using: 5'×⅛" NCW98 on Chromosorb$^W$ 80/100 mesh column an initial/final temperature of 95° C./340° C.; program rate: 10° C./min; detector temp: 350° C.; injector temp: 285° C.; and sample size: 0.5 microliter.

EXAMPLE 1

Preparation of Ethylene Glycol Mononeoheptanoate

To a 1 liter glass flask is added one mole of neoheptanoic acid and 1 gm of potassium hydroxide (solid), to provide the base catalyst for the subsequent ethoxylation reaction. Gaseous nitrogen is introduced to purge oxygen from the flask. A conventional bubbler device provided with NUJOL ® oil is provided in the nitrogen gas feed line to the reaction flask. Gases discharged from the reaction flask are passed through a second such bubbler device. With continuous nitrogen flow through the flask, the temperature of the neo-acid/base mixture is raised to 150° C. at a rate of about 10° C./min. by means of a heating mantle. Thereafter, gaseous nitrogen flow is stopped and is replaced with gaseous ethylene oxide which is permitted to bubble through the neo-acid mixture. Periodic withdrawal of samples of the reaction mixture are made which are titrated to determine the level of residual neo-acid. The addition of ethylene oxide is controlled such that substantially all of the ethylene oxide introduced is reacted, thereby avoiding gaseous throughput through the gas withdrawal line of the reaction vessel. The adsorption of the ethylene oxide is also controlled such that there is no substantial rise in temperature of the reaction vessel due to any reaction exotherm. When it is determined that the proper amount of ethylene oxide has been added (via titration, as described above), the flow of ethylene oxide is terminated, and the reaction vessel is again purged with gaseous nitrogen and allowed to cool to room temperature. (An excess of ethylene oxide should be avoided). The crude product is then washed with water until the washwater is determined to be neutral. The monoethyoxylate thereby obtained is distilled at a pressure of 100 mmHg.

EXAMPLE 2

In a series of runs, the procedure of Example 1 is repeated in order to prepare the monoethyoxylates identified below:

Run 2A, ethylene glycol mononeooctanoate (using neooctanoic acid); and

Run 2B, ethylene glycol mononeodecanoate (using neodecanoic acid).

In Run 2C, ethylene glycol mononeononanoate is prepared using a different procedure. To a one-liter stainless steel autoclave, equipped with a mechanical stirrer, heater, cooling coils and automatic temperature controller, is added 500 grams neononanoic acid and 2.0 g potassium hydroxide. The reactor is heated to approximately 100° C. and a gaseous $N_2$ purge of the reactor is introduced to remove both oxygen and water. With continued $N_2$ purging, the temperature of the neo acid/potassium hydroxide solution is gradually raised to 150° C. Upon reaching temperature, the $N_2$ purge is stopped and the reactor vents are sealed. Ethylene oxide is then slowly added to the reactor until a pressure of 60 psig is obtained. The ethylene oxide flow is then stopped. As the reaction between the neo acid and the ethylene oxide proceeds, the pressure of the reactor vessel will slowly decrease. When the pressure reaches 20 psig, ethylene oxide is again slowly charged to the reactor until a pressure of 60 psig is obtained. The ethylene oxide flow is then decreased to the point where a steady reactor pressure of 60 psig is obtained. The addition of ethylene oxide continues until a total of 139 grams of ethylene oxide have been added to the reaction. The flow of ethylene oxide is then stopped. The reaction mixture is stirred for an additional 20 minutes, until the reactor pressure decreases to 15 psig. Total reaction time, from the start of ethylene oxide addition is about 55 minutes. The reactor is then vented, a gaseous nitrogen purge is introduced, and the reaction product is cooled to room temperature. The crude product is distilled at 109°–125° C. at 15 mmHg. The ethylene glycol mononeononanoate thereby obtained was analyzed by gas chromatography and found to have the following characteristics:

| Color, Pt/Co scale | 30 |
| Specific gravity 20/20 | 1.0362 |
| Refractive index, $n_D^{20}$ | 1.490 |

EXAMPLE 3

Preparation of Ethylene Glycol Benzoate Neoheptanoate

To a 2 liter glass flask was added 313 gms of ethylene glycol mono-neoheptanoate monoester prepared as in Example 1 and 183 gms of benzoic acid, together with 2.0 gms of tetra-isodecyl titanate catalyst and 100 gms ortho-xylene, as an entraining agent. The monoester was therefore used in a 0.2 molar excess over the amount stoichiometrically required to react with the benzoic acid charged. The reaction vessel was initially depressured to 700 mmHg and the reaction was initiated by heating the liquid from room temperature (about 25° C.) at a rate of about 5° to 6° C. per minute by means of a heating mantle, to a maximum temperature of 190° C., with heat being thus supplied for a period of about 350 minutes under continuous stirring using a magnetic stirrer.

The reaction vessel was provided with a DEAN STARK trap in order to separate organic and aqueous phases which are taken overhead during the reaction and to recycle the organic phase containing the desired alcohol back to the reactor, thereby effectively removing water from reaction and forcing the equilibrium further in the direction of the desired diester. Temperature in this procedure was determined by means of a thermocouple immersed in the liquid reaction phase. The pressure in the reaction vessel was controlled to the extent necessary to provide continuous reflux at the selected temperature of reaction. A decrease in pressure over the above reaction time was necessary due to the disappearance of the alcohol as the reaction proceeded.

At the end of the above reaction period (which was determined at a benzoic acid conversion of 99 mol. %), the reaction mixture was allowed to cool to 95° C., at which temperature the liquid is neutralized with 50% aqueous caustic followed by stirring for one-half hour at 95° C. Cool water was then added in an amount of 20 vol.% of the liquid reaction mixture. The resulting organic and aqueous phases were then separated, and the recovered organic phase was washed with water until it was determined to be neutral by pH paper. Thereafter, the organic phase was steam stripped at 160° C. and 100 mmHg to remove the unreacted monoester and entrainer. Thereafter, powdered carbon in an amount of 0.1 wt % of the stripped reaction liquid and clay in an amount of 0.2 wt % of the reaction liquid was added at 95° C. in order to decolor the plasticizer. This mixture was stirred for one hour and then filtered to recover the desired ethylene glycol benzoate neoheptanoate, which was identified by gas chromatography and was found to have the following characteristics:

| Color, Pt—Co | 75 |
| Specific gravity 20/20° C. | 1.0411 |

EXAMPLE 4

Preparation of Ethylene Glycol Benzoate Neooctanoate

The procedure of Example 3 was repeated employing 310 gms of ethylene glycol mononeooctanoate prepared as in Example 2A and 183 gms of benzoic acid, together with 2.0 gms of tetraisodecyl titanate catalyst and 100 gms of ortho-xylene as entrainer. The reaction mixture was heated for approximately 300 minutes to a maximum temperature of 213° C. and a benzoic acid conversion of about 97 mol %. The recovered ethylene glycol benzoate neooctanoate was analyzed by gas chromatography, and was found to have the following characteristics:

| Color Pt. Co. | 50 |
| Specific gravity 20/20° C. | 1.0397 |

EXAMPLE 5

Preparation of Ethylene Glycol Benzoate Neononanoate

Following the procedure of Example 3, 443 gms of ethylene glycol mononeononanoate prepared as in Example 2C and 222 gms of benzoic acid was added to the reaction flask together with 1.5 gms of tetraisodecyl titanate as catalyst. No ortho-xylene entrainer was used in this Example. With continuous stirring the reaction mixture was heated from room temperature to 221° C. at a rate of about 5° to 6° C. per minute for a total heating time of about 150 minutes, employing an initial reaction vessel pressure of about 500 mmHg. During the course of the reaction, the reaction vessel was further depressured to maintain continuous liquid reflux (with the final reaction pressure being about 100 mmHg). After about 150 minutes of reaction, corresponding to a benzoic acid conversion of about 99.2 mol %, ethylene glycol benzoate neononanoate was recovered and analyzed by gas chromatography, and was found to have the following characteristics:

| Color, Pt—Co | 45 |
| Specific gravity 20/20° C. | 1.036 |
| Viscosity, cP, 20° C. | 31.9 |
| Elemental analysis 70.1% C, | 8.6% H |
| Refractive index, $n_D^{20}$ | 1.490 |

EXAMPLE 6

Preparation of Ethylene Glycol Benzoate Neodecanoate

Employing the procedure of Example 3, 255 gms of ethylene glycol mononeodecanoate, was prepared as in Example 2B, and 122 gms of benzoic acid was charged to the reaction flask together with 2.0 gms of tetraisodecyl titanate and 100 gms of ortho-xylene as entrainer, employing an initial reaction vessel pressure of 700 mmHg. The reaction was commenced by heating the vessel at a rate of about 5° to 6° C. per minute to a maximum temperature of 220° C. After 420 minutes of reaction time (corresponding to a benzoic acid conversion of about 88 mol %), ethylene glycol benzoate neodecanoate was recovered and analyzed by gas chromatography, and was found to have the following characteristics:

| | |
|---|---|
| Color, Pt—Co | 60 |
| Specific gravity 20/20° C. | 1.0220 |

EXAMPLE 7

Preparation of Ethylene Glycol Para-toluate Neoheptanoate

Employing the procedure of Example 3, 313 gms of ethylene glycol mononeoheptanoate, prepared as in Example 1, is admixed with 204 gms of para-toluic acid, 2.0 gms of tetraisodecyltitanate and 100 gms of ortho-xylene entrainer. At an initial reaction pressure sure of 600 mmHg, a maximum reaction temperature of 211° C., and a heating rate of about 5° to 6° C. per minute), the reaction was allowed to occur for 490 minutes (corresponding to a toluic acid conversion of about 96 mol %). After this time, the recovered ethylene glycol para-toluate neoheptanoate was analyzed by gas chromatography.

EXAMPLES 8–12

A series of six plastisols were formulated using the ethylene glycol benzoate neoalkanoate esters of Examples 3–6 and the ethylene glycol paratoluate neo-heptanoate of Example 7 as the primary plasticizer and also using the additional plastisol components identified in Table 1, in the proportions indicated.

TABLE 1

| Plastisol Compositions | | |
|---|---|---|
| Component | Parts by Weight | Wt. % |
| FPC ® 605 (1) | 60 | 36.8 |
| Pliovic ® M-50 (2) | 40 | 24.5 |
| Plasticizer* | 44 | 27.0 |
| TXIB ® (3) | 6 | 3.7 |
| Epoxidized Soybean Oil | 5 | 3.1 |
| NUOSTABE ® V 1420 (4) | 3 | 1.8 |
| Mineral Spirits | 5 | 3.1 |
| Total | 163 | 100.0 |

(1) Dispersion grade poly(vinyl chloride) ("PVC") manufactured by Occidental Chemical Company.
(2) Blending grade PVC manufactured by Goodyear Chemical.
(3) 2,2,4-trimethyl-1,3-pentanediol diisobutyrate (Tennessee Eastman)
(4) Liquid Ca—Zn complex stabilizer (Nuodex)

TABLE 1-continued

| Plastisol Compositions | |
|---|---|
| *Example No. | Primary Plasticizer |
| 8 | ethylene glycol benzoate neoheptanoate |
| 9 | ethylene glycol benzoate neooctanoate |
| 10 | ethylene glycol benzoate neononanoate |
| 11 | ethylene glycol benzoate neodecanoate |
| 12 | ethylene glycol para-toluate neoheptanoate |
| Comparative I | mixed isobutyrate and benzoate esters of trimethyl pentanediol(containing about 65% of 2,2,4-trimethyl-1,3-pentanediol isobutyrate benzoate, 6% 2,2,4-trimethyl-1,3-pentanediol di-isobutyrate, and 24% 2,2,4-trimethyl-1-,3-pentanediol dibenzoate (Nuodex Co.). |

EXAMPLE 13

A series of five additional plastisols were formulated using the procedure of Example 8 and the plastisol compositions of Table 1, with the following compounds as the primary plasticizers (item * in Table 1):

| | |
|---|---|
| Example 13 | Ethylene glycol benzoate neodecanoate (1) |
| Comparative II | Nuoplaz TM 1046 mixed isobutyrate and benzoate esters of trimethyl pentanediol (2) |
| Comparative III | Dipropylene glycol dibenzoate |
| Comparative IV | Propylene glycol dibenzoate |
| Comparative V | Mixed isobutyrate and benzoate esters of tri-methyl pentanediol (3) |
| Comparative VI | Dihexyl phthalate |
| Comparative VII | Butyl benzyl phthalate |

(1) Obtained following the procedure used in Example 2B.
(2) A mixture containing about 65% 2,2,4-trimethyl-1,3-pentanediol isobutyrate benzoate, 6% 2,2,4-trimethyl-1,3-pentanediol di-isobutyrate, and 24% 2,2,4-trimethyl-1,3-pentanediol dibenzoate (Nuodex Co.)

EXAMPLE 14

A plastisol was formulated using ethylene glycol benzoate neononanoate (prepared as in Example 5) as the primary plasticizer and the additional plastisol components; identified in Table 10, in the proportions indicated. A comparative plastisol (Comparative VIII) was formulated using components which are also indicated in Table 10. Each plastisol was then used to prepare test specimens and the data thereby obtained are set forth in Table 11.

TABLE 2

| | Plastisol Viscosities* (POISE) | | | | | |
|---|---|---|---|---|---|---|
| Brookfield | Example No. | | | | | |
| Viscosity, Poise, 25° C. | Comparative I | 8 | 9 | 10 | 11 | 12 |
| 2 RPM | | | | | | |
| 2 hrs | 8.8 | 6.2 | 6.8 | 6.5 | 8.2 | 7.1 |
| 24 hrs | 8.7 | 7.1 | 7.8 | 7.3 | 8.8 | 7.8 |
| 20 RPM | | | | | | |
| 2 hrs | 6.8 | 4.7 | 5.3 | 5.4 | 6.1 | 5.5 |
| 24 hrs | 7.3 | 5.4 | 5.9 | 5.9 | 6.6 | 6.3 |

*Plastisol viscosities were measured at 25° C. using a RVF Brookfield Viscometer with a No. 4 spindle.

TABLE 3

Comparative Properties and Performance of Plasticizers

| Property | Comparative I | 8 | 9 | 10 | 11 | 12 |
|---|---|---|---|---|---|---|
| Plastisol Air Release, sec. | 0.5 | 0.3 | 0.3 | 0.3 | 0.3 | 0.2 |
| Hot Bench Gelation Temp., °F. | 159 | 148 | 152 | 156 | 164 | 151 |
| Performance (a) | | | | | | |
| Shore A Hardness, 15 sec. (1) | 71 | 68 | 69 | 70 | 71 | 68 |
| Physical Properties (2) at 50° F., 20 mils | | | | | | |
| Tensile Strength, psi | 3330 | 3150 | 3130 | 3080 | 3200 | 3080 |
| Elongation, % | 220 | 250 | 240 | 240 | 250 | 230 |
| 100% Modulus, psi | 2430 | 1920 | 2010 | 1990 | 2070 | 2050 |
| Clash-Berg, $T_f$, °C. (3) | −26 | −34 | −33 | −33 | −34 | −32 |
| Carbon Black Volatilities, wt. loss, %, 24 hrs at 70° C. | 12.3 | 19.8 | 18.0 | 16.6 | 13.9 | 16.5 |
| Aged 168 hrs at 70° C. | | | | | | |
| Elongation retained, % | 6.9 | 1.7 | 2.6 | 3.1 | 1.6 | 2.5 |
| Tensile retained, % | 195 | 213 | 228 | 205 | 164 | 235 |
| Volatility, wt. % | 18.9 | 25.2 | 24.6 | 24.3 | 22.3 | 23.9 |
| Soapy Water Extraction, wt loss, % 24 hrs at 70° C., 10 mil. | 12.2 | 14.6 | 15.7 | 16.1 | 15.6 | 14.5 |
| QUV Weathering, Color Change (4) | | | | | | |
| 500 hrs | 3 | 4.5 | 2 | 1 | 0.5 | 4 |
| 1000 hrs | 5 | 6 | 5 | 5 | 3 | 6 |
| Plasticizer Exudation (5) 70 mils, ⅜" loop | | | | | | |
| 1 Day | None | None | None | None | Slight | None |
| 7 Day | None | None | None | None | None | None |

(a) Compounds prepared by gelation of plastisol for 45 seconds at 370° F. and then molded at 340° F.
(1) ASTM D2240
(2) ASTM D638 (modified die)
(3) ASTM D1043
(4) QUV Accelerated weathering tester (Q Panel Company)
Scale: 0-none, 1-v. slight discoloration, 2-v. light brown, 3-light brown, 4-light to medium brown, 5-medium brown, 6-dark brown.
(5) ASTM D3291

TABLE 4

Oven Heat Stabilities at 350° F. (1)

| Oven Time, Color (2) | Comparative I | 8 | 9 | 10 | 11 | 12 |
|---|---|---|---|---|---|---|
| 15 min. | 1.0 | 1.0 | 1.0 | 1.0 | 0.5 | 1.0 |
| 30 min. | 2.0 | 2.0 | 2.0 | 1.5 | 1.5 | 2.0 |
| 40 min. | 3.0 | 3.0 | 3.0 | 2.0 | 2.5 | 3.0 |
| 50 min. | 4.0 | 4.0 | 4.0 | 3.0 | 3.5 | 4.5 |
| 60 min. | 5.0 | 5.0 | 5.0 | 4.0 | 4.0 | 5.5 |
| 70 min. | 6.5 | 6.0 | 6.0 | 5.0 | 5.0 | 6.5 |
| 80 min. | 8.0 | 7.0 | 7.0 | 6.0 | 6.0 | 7.5 |
| 90 min. | 9.0 | 8.0 | 8.0 | 7.0 | 7.0 | 8.5 |
| 100 min. | 10.0 | 9.0 | 9.0 | 7.5 | 8.0 | 10.0 |
| 110 min. | 10.0 | 10.0 | 10.0 | 8.0 | 9.0 | 10.0 |

(1) Samples placed on glass plates on rotating turntable in forced air oven. A complete set was removed at each interval shown.
(2) Color Scale: 0-no discoloration, 2-lt. yellow, 4-lt. yellow + brown edges, 6-med. yellow + dr. brown edges, 8-brown + blackened edges, 10-black.

TABLE 5

Stain Testing - Wear Layers* (10 Mils)

| Stain Ratings (2) | Comparative I | 8 | 9 | 10 | 11 | 12 |
|---|---|---|---|---|---|---|
| 1.0 min. fusion time | | | | | | |
| Tar Stainant | 1.0 | 1.3 | 1.5 | 2.0 | 3.0 | 1.3 |
| Rit Dye (Black No. 15) | 1.0 | 2.5 | 4.0 | 5.0 | 5.0 | 2.5 |
| Black Shoe Polish | 1.0 | 1.5 | 1.5 | 2.0 | 3.0 | 1.5 |
| 1.5 min. fusion time | | | | | | |
| Tar Stainant | 1.0 | 1.0 | 1.0 | 1.0 | 1.8 | 1.0 |
| Rit Dye (Black No. 15) | 1.0 | 1.0 | 1.0 | 1.2 | 2.5 | 1.0 |
| Black Shoe Polish | 1.0 | 1.0 | 1.0 | 1.2 | 2.0 | 1.0 |
| 2.0 min. fusion time | | | | | | |
| Tar Stainant | 1.0 | 1.0 | 1.0 | 1.0 | 1.0 | 1.0 |
| Rit Dye (Black No. 15) | 1.0 | 1.0 | 1.0 | 1.0 | 1.5 | 1.0 |
| Black Shoe Polish | 1.0 | 1.0 | 1.0 | 1.0 | 1.5 | 1.0 |
| 2.5 min. fusion time | | | | | | |
| Tar Stainant | 1.5 | 1.0 | — | — | — | — |
| Rit Dye (Black No. 15) | 1.0 | 1.0 | — | — | — | — |
| Black Shoe Polish | 1.0 | 1.0 | — | — | — | — |

*Wear layers were prepared by drawing 10 mil. (wet) films of the plastisols on release paper and fusing in a Werner-Mathis oven at 370° F. for the times indicated.
(1) Samples aged 24 hrs before staining.
(2) Scale: 1-v slight, 2-slight, 3-light, 4-medium, 5-heavy
Contact time for stains:

| | |
|---|---|
| Tar Stainant | 30 minutes |
| Rite Dye (Black No. 15) | 24 hours |
| Shoe Polish (black) (Kiwi black diluted with 30 wt % Varsol solvent before applying) | 24 hours |

TABLE 6

Brookfield Viscosities (a) (poise)

| | | Example No. | | | | |
|---|---|---|---|---|---|---|
| Spindle Speed | Time (b) (hrs) | Ex. 13 | Comp. II | Comp. III | Comp. IV | Comp. V |
| 2 rpm | 2 | 10.8 | 13.2 | 18.4 | 16.8 | 10.4 |
| 2 rpm | 24 | 9.9 | 13.7 | 20.0 | 19.0 | 10.7 |
| 24 rpm | 2 | 8.1 | 11.3 | 18.3 | 17.4 | 8.0 |
| 24 rpm | 24 | 7.5 | 10.5 | 19.7 | 18.6 | 7.8 |

(a) All viscosities were measured at 24.5° C. using a model RVF Brookfield viscometer with a No. 4 spindle.
(b) aging time at 25° C.

TABLE 7

| Physical Data (a) | Ex. 3 | Comp. II | Comp. V |
|---|---|---|---|
| Shore A hardness, 15 sec (b) | 71.4 | 71.4 | 72.0 |
| Clash-Berg T$_f$, °C. (c) | −33.1 | −21.6 | −26.4 |
| C Black Volatility, wt. loss, % (d) | 11.6 | 10.7 | 12.1 |

(a) Pads were prepared through drawing of 25 mil films, fusing at 370° F. for 45 seconds and then molding at 340° F.
(b) Average of eight readings per duplicate 250 mil pads (ASTM D2240).
(c) Average of duplicate tests (ASTM D1043).
(d) 24 hrs at 100° C., 20 mil pads (ASTM D1203 modified by using 20 mil pads and 100° C. instead of the specified 10 mil pads and 70° C.).

TABLE 8

Stain Testing - Wear Layers (a)

| Stain Ratings (b) after: | Ex. 13 | Comp. II | Comp. III | Comp. IV | Comp. V | Comp. VI | Comp. VII |
|---|---|---|---|---|---|---|---|
| 1.0 Min. Fusion at 370° F. | | | | | | | |
| Tar Stain | 4.0 | 1.5 | 4.0 | 3.0 | 1.0 | 6.0 | 4.5 |
| Black Shoe Polish | 5.0 | 2.0 | 4.0 | 1.5 | 1.0 | 6.0 | 4.0 |
| Rit Dye-Black | 6.0 | 1.0 | 5.0 | 4.5 | 1.0 | 5.0 | 4.5 |
| Average | 5.0 | 1.5 | 4.3 | 3.0 | 1.0 | 5.7 | 4.3 |
| 1.5 Min. Fusion at 370° F. | | | | | | | |
| Tar Stain | 2.0 | 1.0 | 4.0 | 3.0 | 1.0 | 5.0 | 4.0 |
| Black Shoe Polish | 2.0 | 1.0 | 3.5 | 1.5 | 1.0 | 5.5 | 4.0 |
| Rit Dye-Black | 4.0 | 1.0 | 5.0 | 4.5 | 1.0 | 4.5 | 4.0 |
| Average | 2.7 | 1.0 | 4.2 | 3.0 | 1.0 | 5.0 | 4.0 |
| 2.0 Min. Fusion at 370° F. | | | | | | | |
| Tar Stain | 1.0 | 1.5 | 3.5 | 2.5 | 1.5 | 4.5 | 4.0 |
| Black Shoe Polish | 1.5 | 1.0 | 3.0 | 1.5 | 1.0 | 5.0 | 3.5 |
| Rit Dye-Black | 2.0 | 1.5 | 4.5 | 4.0 | 1.5 | 4.0 | 3.5 |
| Average | 1.5 | 1.3 | 3.7 | 2.7 | 1.3 | 4.5 | 3.7 |

(a) Wear layers were prepared by drawing 10 mil (wet) samples of the plastisols on release paper and fusing in a Werner-Mathis oven at 370° F. for the times indicated.
(b) Rit dye-black and shoe polish (diluted with Varsol, at the 30% level) were applied to wear layers for contact times of 24 hours. Contact time for the tar stain was 30 minutes. Reported values represent an average of three separate stainings for each stain. Stain scale: 0-none, 1-very slight, 2-slight, 3-light, 4-moderate, 5-heavy, 6-very heavy.

TABLE 9

Film Clarity (a)

| Fusion Time | Ex. 13 | Comp. II | Comp. III | Comp. IV | Comp. V |
|---|---|---|---|---|---|
| 1.0 min. | 2.0 | 2.0 | 2.5 | 2.5 | 3.0 |
| 1.5 min. | 1.5 | 3.0 | 3.0 | 3.0 | 4.0 |
| 2.0 min. | 1.0 | 3.5 | 4.0 | 4.0 | 5.0 |

(a) Clarity is observed through visual examination of 10 mil films (prepared on release paper). Clarity scale: 0-very clear, 1-v. slight haze, 2-slight haze, 3-moderate haze, 4-moderate-heavy haze, 5-heavy haze.

TABLE 10

Plastisol Compositions

| | Parts by Weight | | Wt. % | |
|---|---|---|---|---|
| Component | Ex. 14 | Comp. VIII | Ex. 14 | Comp. VIII |
| FPC ® 605 (1) | 60 | 60 | 38.5 | 37.5 |
| Pliovic ® M-50 (2) | 40 | 40 | 25.6 | 25.0 |
| Plasticizer* | 36 | 44 | 23.1 | 27.5 |
| TXIB ® (3) | 7 | 3 | 4.5 | 1.9 |
| Drapex 4.4 (4) | 5 | 5 | 3.2 | 3.1 |
| Aromatic 150 (5) | 5 | 5 | 3.2 | 3.1 |
| Nuostabe ® V1420 (6) | 3 | 3 | 1.9 | 1.9 |
| Total | 156 | 160 | 100 | 100 |

(1) Dispersion grade poly(vinyl chloride) ("PVC") manufactured by Occidental Chemical Company.
(2) Blending grade PVC manufactured by Goodyear Chemical.
(3) 2,2,4-trimethyl-1,3-pentanediol diisobutyrate (Tennessee Eastman).
(4) Stabilizer, Octyl epoxytallate (Witco Corporation).
(5) Aromatic solvent (Exxon Company USA).
(6) Liquid Ca—Zn complex stabilizer (Nuodex).
*Ex. 14: ethylen glycol benzoate neononanoate. Comp. Ex. VIII: A mixture of 64 wt. % 2,2,4-trimethyl-1,3-pentanediol isobutyrate benzoate, 17 wt. % 2,2,4-trimethyl-1,3-pentanediol di-isobutyrate and 19 wt % 2,2,4-trimethyl-1,3-pentanediol dibenzoate. (nuodex Company.)

TABLE 11

| | Comp. VIII | Ex. 14 |
|---|---|---|
| Plastisol Viscosity, Brookfield, poise | | |
| 2 rpm at 2 hrs | 11.1 | 9.4 |
| 20 rpm at 2 hrs | 8.5 | 6.9 |
| Plastisol Weight Loss During Fusion at 188° C., wt. % | | |
| at 2 minutes | 2.7 | 2.3 |
| at 6 minutes | 9.3 | 10.4 |
| Tensile Properties (2) | | |
| Shore A Durometer Hardness (15 sec) | 77 | 79 |
| Tensile Strength, psi (20 mils) | 2760 | 2750 |
| Elongation % (20 mils) | 180 | 170 |
| 100% modulus (20 mils) | 2140 | 2200 |
| Clash Berg, Tf, °C. | −18 | −25 |
| Plasticizer Exudation, ⅜" Loop Test (3) | | |
| at 1 day | None | None |
| at 7 days | None | None |
| Aged Physicals, 24 hrs at 70° C. | | |
| Tensile Strength, psi (2) | 2950 | 3220 |
| Elongation, % (2) | 130 | 150 |
| 100% modulus, psi (2) | 2770 | 2940 |
| Retained elongation, % | 70 | 90 |
| Weight Loss, % | 10.2 | 12.5 |
| Stain Testing (4) | | |
| 1.0 Min Fused Wear Layers | | |
| Rit Dye | 0 | 0.5 |
| Shoe Polish | 1.0 | 1.0 |
| Tar Stain | 1.0 | 1.0 |
| 1.5 Min Fused Wear Layers | | |

TABLE 11-continued

|  | Comp. VIII | Ex. 14 |
| --- | --- | --- |
| Rit Dye | 0 | 0 |
| Shoe Polish | 0.5 | 0.5 |
| Tar Stain | 0.5 | 0.5 |
| 2.0 Min Fused Wear Layers |  |  |
| Rit Dye | 0 | 0 |
| Shoe Polish | 0.5 | 0.5 |
| Tar Stain | 0.5 | 0.5 |

(1) Weight loss for 1.8 g sample on a 3¼" aluminum dish (20 mil cavity) heated in a Werner Mathis oven.
(2) Specimens prepared by gellation of a 25 mil plastisol sample in a Werner Mathis oven for 3.0 minutes at 188° C. Molding was at 340° F. Property measurements made using test methods identified in Table 3.
(3) ASTM D 3291.
(4) Scale: 0-none, 1-v. slight, 2-slight, 3-light, 4-medium, 5-heavy. Wear layers prepared through heating 10 mil samples of plastisol on release paper at 188° C. in a Werner Mathis oven for the times indicated.

From the foregoing description, one skilled in the art can easily ascertain the essential characteristics of this invention and without departing from the spirit and scope thereof can make various changes and/or modifications to the invention for adapting it to various usages and conditions. Accordingly, such changes and modifications are properly intended to be within the full range of equivalents of the following claims.

What is claimed is:

1. Compounds of the formula:

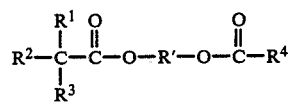

wherein $R^1$ and $R^2$ are the same or different and are independently selected from the group consisting of alkyl of from 1 to 4 carbon atoms, $R^3$ is hydrogen or alkyl of from 1 to 6 carbon atoms, $R'$ is divalent alkylene of from 2 to 8 carbon atoms and $R^5$ is a member selected from the group consisting of phenyl, mono-, di- or tri-alkyl-substituted phenyl having a total of from 7 to 12 carbon atoms and

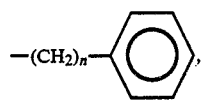

wherein "n" is an integer of from 1 to 6, with the proviso that said compound contains a total of from 16 to 19 carbon atoms per molecule, and with the further proviso that when $R^1$, $R^2$ and $R^3$ contain a total of 2 carbon atoms and $R'$ contains a total of 8 carbon atoms, then $R'$ must comprise a straight chain alkylene or a mono- or di-alkyl substituted divalent alkylene group, and mixtures thereof.

2. The compounds of claim 1 wherein $R^1$ and $R^2$ are each independently selected from the group consisting of methyl, ethyl, n-propyl and iso-propyl, and wherein $R^3$ is selected from the group consisting of H, methyl, ethyl, n-propyl, iso-propyl, n-butyl, iso-butyl, sec-butyl, pentyl, hexyl and alkylsubstituted derivatives of the foregoing in which the total number of carbon atoms of the alkyl-substituted alkyl group is not greater than 6 carbon atoms.

3. The compounds of claim 1 wherein $R^3$ comprises alkyl of 1 to 6 carbon atoms and $R'$ comprises a member selected from the group consisting of straight chain alkylene moieties of the formula $-(CH_2)_m-$ wherein m is an integer of from 2 to 7.

4. The compounds of claim 1 wherein $R^5$ comprises a member selected from the group consisting of phenyl, tolyl, xylyl, 3-isopropyl phenyl, 3-methyl-5-ethyl phenyl, and $-CH_2C_6H_5$, $-C_2H_4C_6H_5$, $-C_3H_6C_6H_5$.

5. The compounds of claim 4 wherein $R^5$ is phenyl, $R^1$, $R^2$ and $R^3$ contain a total of 2 carbon atoms, and $R'$ comprises a mono- or di-alkyl substituted divalent alkylene group containing a total of 8 carbon atoms.

6. The compounds of claim 1 wherein $R^1$, $R^2$ and R have a total of from 2 to 8 carbon atoms, $R^4$ comprises $-(CH_2)_p-$ in which "p" is an integer of from 2 to 4, and $R^5$ is

in which $R^6$ is hydrogen or alkyl of from 1 to 6 carbons, and mixtures thereof.

7. The compounds of claim 6 wherein $R^6$ is hydrogen, p is 2 to 4, $R^1$ and $R^2$ are each $C_1$ to $C_3$ alkyl radicals and $R^3$ is H or $C_1$ to $C_6$ alkyl radicals.

8. The compounds of claim 7 wherein p is 2, and the

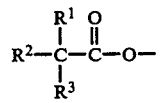

moiety is derived from isobutyric acid or a neo-acid having a total of from 5 to 10 carbon atoms.

9. Compounds of the formula:

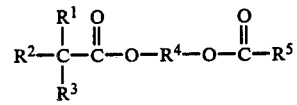

wherein $R^1$ and $R^2$ are the same or different and are independently selected from the group consisting of alkyl of from 1 to 4 carbon atoms, $R^3$ is hydrogen or alkyl of from 1 to 6 carbon atoms, $R^4$ is divalent straight-chain alkylene of from 2 to 8 carbon atoms and $R^5$ is a member selected from the group consisting of phenyl, mono-, di- or tri-alkyl-substituted phenyl having a total of from 7 to 12 carbon atoms and

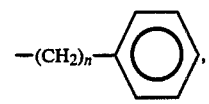

wherein "n" is an integer of from 1 to 6, with the proviso that said compound contains a total of from 16 to 19 carbon atoms per molecule, and mixtures thereof.

10. The compounds of claim 9 wherein $R^1$ and $R^2$ are each independently selected from the group consisting of methyl, ethyl, n-propyl and iso-propyl, and wherein $R^3$ is selected from the group consisting of H, methyl, ethyl, n-propyl, iso-propyl, n-butyl, iso-butyl, sec-butyl, pentyl, hexyl and alkyl-substituted derivatives of the foregoing in which the total number of carbon atoms of the alkyl-substituted alkyl group is not greater than 6 carbon atoms.

11. The compounds of claim 10 wherein $R^4$ comprises a member selected from the group consisting of straight chain alkylene moieties of the formula —$(CH_2)_m$— wherein m is an integer of from 2 to 7.

12. The compounds of claim 10 wherein $R^5$ comprises a member selected from the group consisting of phenyl, tolyl, xylyl, 3-isopropyl phenyl, 3-methyl-5-ethyl phenyl, and —$CH_2C_6H_5$, —$C_2H_4C_6H_5$, —$C_3H_6C_6H_5$.

13. The compounds of claim 10 wherein $R^1$, $R^2$ and $R^3$ have a total of from 2 to 8 carbon atoms, $R^4$ comprises —$(CH_2)_p$— in which "p" is an integer of from 2 to 4, and $R^5$ is

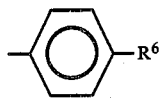

in which $R^6$ is hydrogen or alkyl of from 1 to 6 carbons, and mixtures thereof.

14. The compounds of claim 13 wherein $R^6$ is hydrogen, p is 2 to 4, $R^1$ and $R^2$ are each $C_1$ to $C_3$ alkyl radicals and $R^3$ is H or $C_1$ to $C_6$ alkyl radicals.

15. The compounds of claim 14 wherein p is 2, and the

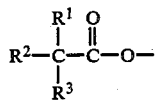

moiety is derived from isobutyric acid or a neo-acid having a total of from 5 to 10 carbon atoms.

16. 1,4-butanediol benzoate neopentanoate.
17. Ethylene glycol toluate neohexanoate.
18. Ethylene glycol benzoate neoheptanoate.
19. Ethylene glycol benzoate neooctanoate.
20. Ethylene glycol benzoate neononanoate.
21. Ethylene glycol benzoate neodecanoate.
22. Compounds of the formula:

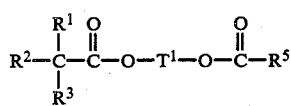

wherein $R^1$ and $R^2$ are the same or different and are independently selected from the group consisting of alkyl of from 1 to 4 carbon atoms, $R^3$ is hydrogen or alkyl of from 1 to 6 carbon atoms, $T^1$ is divalent branched-chain alkylene of from 2 to 7 carbon atoms and $R^5$ is a member selected from the group consisting of phenyl, mono-, di- or tri-alkyl-substituted phenyl having a total of from 7 to 12 carbon atoms and

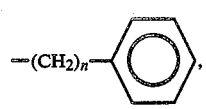

wherein "n" is an integer of from 1 to 6, with the proviso that said compound contains a total of from 16 to 19 carbon atoms per molecule, and mixtures thereof.

23. The compounds of claim 22 wherein $R^1$ and $R^2$ are each independently selected from the group consisting of methyl, ethyl, n-propyl and iso-propyl, and wherein $R^3$ is selected from the group consisting of H, methyl, ethyl, n-propyl, iso-propyl, n-butyl, iso-butyl, sec-butyl, pentyl, hexyl and alkyl-substituted derivatives of the foregoing in which the total number of carbon atoms of the alkyl-substituted alkyl group is not greater than 6 carbon atoms.

24. The compounds of claim 22 wherein $T^1$ comprises a member selected from the group consisting of 2-ethyl-1,3-pentylene, 1-methyl ethylene, 2-methyl-1,3-propylene, 1,2-ethylene, 2,3-pentylene, and 3-methyl-2,4-pentylene.

25. The compounds of claim 22 wherein $R^5$ comprises a member selected from the group consisting of phenyl, tolyl, xylyl, 3-isopropyl phenyl, 3-methyl-5-ethyl phenyl, and —$CH_2C_6H_5$, —$C_2H_4C_6H_5$, —$C_3H_6C_6H_5$.

26. The compounds of claim 22 wherein $R^1$, $R^2$ and $R^3$ have a total of from 2 to 8 carbon atoms, $T^1$ comprises a divalent alkyl-substituted alkylene group having from 2 to 5 carbon atoms, and $R^5$ is

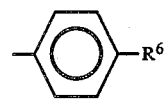

in which $R^6$ is hydrogen or alkyl of from 1 to 3 carbons, and mixtures thereof.

27. The compounds of claim 26 wherein $R^6$ is hydrogen, $R^1$ and $R^2$ are each $C_1$ to $C_3$ alkyl radicals and $R^3$ is H or $C_1$ to $C_6$ alkyl radicals.

28. The compounds of claim 19 wherein the

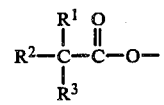

moiety is derived from isobutyric acid or a neo-acid having a total of from 5 to 10 carbon atoms.

29. Compounds of the formula:

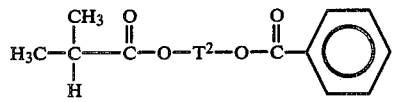

wherein $T^2$ is mono-alkyl or di-alkyl substituted divalent alkylene of 8 carbon atoms.

30. The compounds of claim 21 wherein $T^2$ comprises a member selected from the group consisting of 2-ethyl-1,3-hexylene, 2,2-di(ethyl)-1,4-butylene, and 2-methyl-4-ethyl-1,5-pentylene.

31. A plasticizer polymer resin composition which comprises an admixture of at least one polymer resin and a plasticizing effective amount at least one compound of the formula

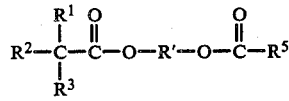

wherein R¹ and R² are the same or different and are independently selected from the group consisting of alkyl of from 1 to 4 carbon atoms, R³ is hydrogen or alkyl of from 1 to 6 carbon atoms, R' is divalent alkylene of from 2 to 8 carbon atoms and R⁵ is a member selected from the group consisting of phenyl, mono-, di- or tri-alkyl-substituted phenyl having a total of from 7 to 12 carbon atoms and

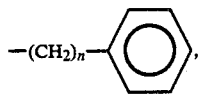

wherein "n" is an integer of from 1 to 6, with the proviso that said compound contains a total of from 16 to 19 carbon atoms per molecule, and with the further proviso that when R¹, R² and R³ contain a total of 2 carbon atoms and R' contains a total of 8 carbon atoms, then R' must comprise a straight chain alkylene or a mono- or di-alkyl substituted divalent alkylene group.

32. The plasticized compositions of claim 31 wherein R¹ and R² are each independently selected from the group consisting of methyl, ethyl, n-propyl and iso-propyl, and wherein R³ is selected from the group consisting of H, methyl, ethyl, n-propyl, isopropyl, n-butyl, iso-butyl, sec-butyl, pentyl, hexyl and alkyl-substituted derivatives of the foregoing in which the total number of carbon atoms of the alkylsubstituted alkyl group is not greater than 6 carbon atoms.

33. The plasticized compositions of claim 31 wherein R⁴ comprises a member selected from the group consisting of straight chain alkylene moieties of the formula —(CH₂)$_m$— wherein m is an integer of from 2 to 7.

34. The plasticized compositions of claim 31 wherein R⁵ comprises a member selected from the group consisting of phenyl, tolyl, xylyl, 3-isopropyl phenyl, 3-methyl-5-ethyl phenyl, and —CH₂C₆H₅, —C₃H₆C₆H₅.

35. The plasticized compositions of claim 31 wherein R¹, R² and R³ have a total of from 2 to 8 carbon atoms, R⁴ comprises —(CH₂)$_p$— in which "p" is an integer of from 2 to 4, and R⁵ is

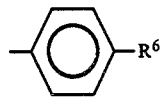

in which R⁶ is hydrogen or alkyl of from 1 to 6 carbons, and mixtures thereof.

36. The plasticized compositions of claim 35 wherein R⁶ is hydrogen, p is 2 to 4, R¹ and R² are each C₁ to C₃ alkyl radicals and R³ is H or C₁ to C₆ alkyl radicals.

37. The plasticized compositions of claim 36 wherein p is 2, and the

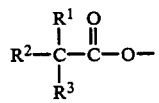

moiety is derived from isobutyric acid or a neo-acid having a total of from 5 to 10 carbon atoms.

38. The plasticized compositions of claim 31 wherein said stain resistant plasticizer is employed in an amount of from 1 to 200 parts per 100 parts of said polymer resin.

39. The plasticized compositions of claim 38 wherein said polymer resin comprises poly (vinyl chloride).

40. The plasticized compositions of claim 39 wherein said compound comprises 1,4-butanediol benzoate neopentanoate.

41. The plasticized compositions of claim 39 wherein said compound comprises ethylene glycol toluate neohexanoate.

42. The plasticized compositions of claim 39 wherein said compound comprises ethylene glycol benzoate neoheptanoate.

43. The plasticized compositions of claim 39 wherein said compound comprises ethylene glycol benzoate neooctanoate.

44. The plasticized compositions of claim 39 wherein said compound comprises propylene glycol benzoate neononanoate.

45. The plasticized compositions of claim 39 wherein said compound comprises ethylene glycol benzoate neononanoate.

46. The plasticized compositions of claim 39 wherein said compound comprises ethylene glycol benzoate neodecanoate.

47. A method of producing a plasticized polymer resin composition which comprises admixing a polymer resin with a plasticizing effective amount of at least one member selected from the group consisting of:

(i) compounds of the formula:

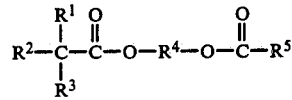

wherein R¹ and R² are the same or different and are independently selected from the group consisting of alkyl of from 1 to 4 carbon atoms, R³ is hydrogen or alkyl of from 1 to 6 carbon atoms, R⁴ is divalent straight chain alkylene of from 2 to 8 carbon atoms and R⁵ is a member selected from the group consisting of phenyl, mono-, di- or tri-alkyl-substituted phenyl having a total of from 7 to 12 carbon atoms and

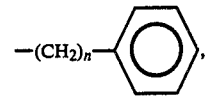

wherein n is an integer of from 1 to 6 with the proviso that said compound contains as total of from 16 to 19 carbon atoms per molecule, inclusive, and mixtures, thereof;

(ii) compounds of the formula:

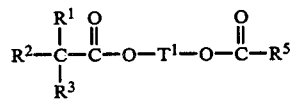

wherein R¹, R², R³ and R⁵ are as defined above, and T¹ is divalent branched-chain alkylene of from 2 to 7 carbon atoms, with the proviso that said compounds contain a total of from 16 to 19 carbon atoms per molecule; and (iii) compounds of the formula:

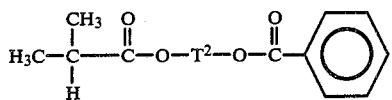

wherein T² is mono-alkyl or di-alkyl substituted divalent alkylene of 8 carbon atoms.

48. The method according to claim 47 wherein said plasticizing compound comprises a member selected from the group consisting of 1,4-butanediol benzoate neopentanoate, ethylene glycol toluate neohexanoate, ethylene glycol benzoate neoheptanoate, ethylene glycol benzoate neooctanoate, ethylene glycol benzoate neononanoate, and ethylene glycol benzoate neodecanoate.

* * * * *